United States Patent
Rusch et al.

(10) Patent No.: US 12,140,193 B2
(45) Date of Patent: Nov. 12, 2024

(54) TORSIONAL VIBRATION DAMPER

(71) Applicant: Schaeffler Technologies AG & Co. KG, Herzogenaurach (DE)

(72) Inventors: Alain Rusch, Gambsheim (FR); Martin Häßler, Graben-Neudorf (DE); Michael Kessler, Bühl (DE); Laurent Theriot, Strasbourg (FR)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 409 days.

(21) Appl. No.: 17/618,766

(22) PCT Filed: Jun. 22, 2020

(86) PCT No.: PCT/DE2020/100526
§ 371 (c)(1),
(2) Date: Dec. 13, 2021

(87) PCT Pub. No.: WO2021/008649
PCT Pub. Date: Jan. 21, 2021

(65) Prior Publication Data
US 2022/0260132 A1 Aug. 18, 2022

(30) Foreign Application Priority Data
Jul. 12, 2019 (DE) ............ 10 2019 118 971.3

(51) Int. Cl.
*F16F 15/123* (2006.01)
*F16F 15/12* (2006.01)
*F16D 3/48* (2006.01)

(52) U.S. Cl.
CPC ...... *F16F 15/1232* (2013.01); *F16F 15/1205* (2013.01); *F16D 3/48* (2013.01); *F16F 2230/0064* (2013.01); *F16F 2232/04* (2013.01)

(58) Field of Classification Search
CPC .............. F16F 15/1232; F16F 15/1205; F16F 2230/0064; F16F 2232/04; F16D 3/48
USPC ........................ 464/65.1, 81, 161
See application file for complete search history.

(56) References Cited

U.S. PATENT DOCUMENTS

| 858,412 A * | 7/1907 | Neate ............ B60C 7/16 |
| | | 464/65.1 |
| 3,958,464 A * | 5/1976 | Kronbergs ......... F16H 48/24 |
| 11,719,285 B2 * | 8/2023 | Inata ............ F16F 15/121 |

FOREIGN PATENT DOCUMENTS

| CN | 102686909 A | 9/2012 |
| CN | 106460951 A | 2/2017 |
| CN | 106461006 A | 2/2017 |
| CN | 107850174 A | 3/2018 |
| DE | 1475304 A1 | 8/1969 |

(Continued)

*Primary Examiner* — Greg Binda

(57) ABSTRACT

A torsional vibration damper includes a common axis of rotation extending along an axial direction, an input part, an output part, rotatable relative to the input part in a limited manner with torque transmission, and a ramp system. The ramp system includes an axially displaceable component, a plurality of rolling elements for converting rotation of the input part relative to the output part into an axial shifting of the axially displaceable component, and a plurality of energy storage elements. The plurality of energy storage elements are arranged distributed along a circumferential direction, extend along the axial direction, and are elastically deformable in the axial direction.

9 Claims, 4 Drawing Sheets

(56) References Cited

FOREIGN PATENT DOCUMENTS

| | | | |
|---|---|---|---|
| DE | 2063370 | A1 | 7/1972 |
| DE | 3325214 | A1 | 2/1985 |
| DE | 3500920 | A1 | 7/1986 |
| DE | 102012219189 | A1 | 4/2014 |
| DE | 102014214193 | A1 | 2/2015 |
| DE | 102016206854 | A1 | 11/2016 |
| DE | 102015211899 | A1 | 12/2016 |
| DE | 102017126460 | A1 | 5/2018 |
| EP | 0131881 | A2 | 1/1985 |
| EP | 2899426 | A1 | 7/2015 |
| FR | 3058489 | A1 | 5/2018 |
| WO | 2007054059 | A1 | 5/2007 |
| WO | 2010012078 | A1 | 2/2010 |

* cited by examiner

TORSIONAL VIBRATION DAMPER

CROSS-REFERENCE TO RELATED APPLICATIONS

This application is the United States National Phase of PCT Appln. No. PCT/DE2020/100526 filed Jun. 22, 2020, which claims priority to German Application No. DE102019118971.3 filed Jul. 12, 2019, the entire disclosures of which are incorporated by reference herein.

TECHNICAL FIELD

The present disclosure relates to a torsional vibration damper. The torsional vibration damper is used in particular in a drive train of a motor vehicle.

BACKGROUND

Torsional vibration dampers are torsional compliances introduced into a drive train that is excited with periodic disturbances. The aim here is to shift the disruptive resonance vibrations that occur in various operating situations to a speed range below the operating speeds as far as possible. Resonance vibrations remaining within the operating speed range are dampened by an external or integrated friction device, the friction torque of which must be within defined limits. The friction device can in particular be designed independently of the torsional compliance and is therefore not considered in the following.

To enable a largely supercritical operation with good vibration isolation from the disturbances in the drive, the greatest possible torsional compliance, i.e., a low torsional rigidity, is aimed for. However, at the same time, the maximum drive torque must be covered, which with low torsional rigidity requires a correspondingly high angle of rotation. In a given installation space, however, the torsional angle that can be represented is naturally limited by the capacity of the energy storage device used and the components that are to be sufficiently robustly designed and are in the torque flow. It is therefore advantageous to arrange the energy storage elements of the torsional vibration damper outside of a torque flow.

For certain applications, compact versions of torsional vibration dampers are required (i.e., small diameter, possibly greater available length along the axial direction). Such requirements are present, for example, in motorcycles or electrical machines. In electrical machines, torsional vibration dampers are to be arranged, for example, within a rotor.

It is also known to use, for example, a disk spring as an energy storage element. Disk springs are, however, regularly produced by stamping and therefore have a cutting edge on the force edge thereof. As a result, the service life can be severely restricted, especially under pulsating loads, especially in comparison to compression springs or helical compression springs (the surface quality of compression spring wires is significantly better than that of the punched edge of a disk spring).

It is also known to use balls as rolling elements. However, these have comparatively small contact areas and therefore only have a low force capacity. An alternative possibility concerns cylindrical rollers, wherein these however will not move along a circumferential direction when rolling.

Such torsional vibration dampers of a variety of different types are known from the prior art. For example, from FR 3058489 A1 is known a torsional vibration damper with compression springs acting in the circumferential direction. With a small outer diameter, the damper also has a comparatively great length in the axial direction.

From DE 1 475 304 A1 is known a torsionally elastic clutch disk, wherein a disk part carrying the friction linings can be rotated to a limited extent and resiliently in connection with a hub part via rolling elements, e.g., balls. The rolling elements are arranged in sector-shaped pockets which are formed by recesses in the disk part and in intermediate pieces which are connected to the hub part in a rotationally fixed and axially resilient manner. Disk springs or a rubber ring are provided as spring elements.

From DE 2 063 370 A1 is known a torsionally elastic clutch disk in which a web extending in the radial direction starting from the friction linings has pockets with rolling elements arranged therein. On the hub are supported disk spring-like springs which interact with the rolling elements and the pockets. The disks are supported on external disks in the area of the hub. The disks have tracks that are completed in a spherical manner.

DE 3 500 920 A1 describes a torsionally elastic clutch disk in which a ramp system builds up elasticity, wherein damping is produced by oil. The ramp system is formed on disk springs, and compression springs also support the disk springs in the axial direction.

DE 10 2015 211 899 A1 A1 discloses a torsional vibration damper in the form of a pendulum rocker damper (PWD). The pendulum rockers, referred to there as intermediate elements, actuate energy stores while they are guided relative to the input part and output part via rolling elements that roll or slide in corresponding tracks. This results in a torsion damper characteristic curve when the input part is rotated in relation to the output part about the axis, the slope of which can be made variable by means of the shape of the tracks.

SUMMARY

The present disclosure relates to a torsional vibration damper including an input part and an output part with a common axis of rotation extending along an axial direction. The input part and the output part can be rotated to a limited extent relative to one another along a circumferential direction during torque transmission (e.g., introduction via the input part to the output part and forwarding via the output part; or vice versa). The torsional vibration damper has a ramp system with rolling elements, by means of which a relative rotation of the input part and output part can be converted into a shifting along the axial direction of at least one component of the torsional vibration damper. The torsional vibration damper has a plurality of energy storage elements. The energy storage elements of the torsional vibration damper are distributed (evenly) along the circumferential direction (and spaced apart from one another) and each extends along the axial direction and can be elastically deformed in the axial direction.

The ramp system is designed between the input part and the output part in such a way that a relative rotation of the input part and the output part can be converted into a shifting along the axial direction of a component of the torsional vibration damper. The energy storage elements can be elastically deformed in the axial direction via the component.

In particular, the input part and the output part are axially fixed (relative to one another) so that the shifting is transferred to the energy storage elements via another component.

In particular, the torsional vibration damper does not have any disk springs as energy storage elements that can be braced via the ramp systems.

In particular, the rolling elements roll exclusively along the circumferential direction. An axis of rotation (roller axis) of each rolling element runs along the radial direction or inclined in relation to the axial direction towards the radial direction.

In particular, the at least one ramp system has tapered rollers or conical spherical rollers as rolling elements. In particular, the tip of a cone, formed by a lateral surface, of the rolling element designed as a conical roller is arranged on the axis of rotation. Spherical rollers are also proposed for a ramp system, the lateral surfaces of which are arranged on a common circular radius.

In particular, it can thus be ensured that when the rolling elements roll in the ramp system, the rolling elements move along the circumferential direction.

In particular, the energy storage elements are designed as compression springs.

In particular, compression springs are used exclusively as energy storage elements.

In particular, a first group of rolling elements are arranged on a first diameter in a first ramp system and a second group of rolling elements on a second diameter (different from the first diameter) in a second ramp system.

In particular, the first group and the second group comprise rolling elements that are different from one another or that are identical to one another.

In particular, the first ramp system is formed by the input part and a first disk extending along the circumferential direction around the axis of rotation, and the first group (of rolling elements) is arranged between the input part and the first disk. The second ramp system is formed by the output part and the first disk, and the second group (of rolling elements) is arranged between the output part and the first disk. The first disk is the component that can be shifted along the axial direction.

In particular, each ramp system is formed by first ramps and second ramps, and a rolling element is arranged between a first ramp and a second ramp, which form a pair of ramps. First ramps and second ramps are each formed on a component of the torsional vibration damper. The first ramps and the second ramps are distributed along the circumferential direction on the respective component.

In particular, in the first group, a plurality of first ramps is formed on the input part. The second ramps of the first group are fainted on the first disk.

In particular, in the second group, a plurality of first ramps is formed on the output part. The second ramps of the second group are formed on the first disk.

If, for example, a torque is introduced into the torsional vibration damper via the input part, the rolling elements are rolled along from a rest position of the respective ramp pairing along the circumferential direction and along the ramp slope due to an existing torque gradient across the torsional vibration damper. Due to the geometrical relationship of the pair of ramps, the first disk is shifted in relation to the input part or the output part along the axial direction, and an opposing force of the energy storage elements is overcome. When the torque gradient drops, the rolling elements roll back in the direction of the rest position, and the energy storage elements are discharged or at least partially relaxed.

With this torque-related movement, the rolling element forces the first disk to move relative to the axial direction and the energy storage elements are tensioned accordingly.

If there is a change in the applied torque and, as a result, a speed difference between the input side and the output side, such as in the case of a torsional vibration, this is counteracted by the inertia of the other of the input side and the output side, and the rolling elements roll (in a predetermined manner) back and forth along the ramp at the position corresponding to the applied torque. The rolling elements thus counteract the energy storage elements, which are tensioned as a function of a torque amount, so that a natural frequency is changed compared to a rest position or torque transmission without a torsional vibration damper (but with the same flywheel mass that is moved along).

In particular, it is provided that the respective ramp pairing includes a pulling torque pairing with a first transmission curve and a pushing torque pairing with a second transmission curve. The pulling torque pairing is set up for torque transmission from the input part to the output part, and the pushing torque pairing being set up for torque n from the output part to the input part. In particular, the first gear ratio curve and the second gear ratio curve have gear ratios that differ from one another at least in regions.

In general, a traction torque and a thrust torque do not differ in a theoretical application. The terms are therefore to be seen neutrally and only serve to make it easy to distinguish the designated torque transmission direction. These terms are taken from the usual designations in a drive train of a motor vehicle, but can be transferred accordingly for other applications.

In particular, the first transmission curve and the second transmission curve, which each start from a common point of the rest position, are provided with different transmission ratio progressions. The rigidity properties of the torsional vibration damper can therefore be individually set up (differently) for a traction torque and a thrust torque.

In one embodiment, for example, a large damping moment is required for the transmission of a traction torque, which can be achieved over a larger angle of rotation (a lower reduction ratio, i.e., a smaller denominator of the transmission ratio) than is desired for a thrust torque (a larger reduction ratio). Furthermore, for example, a progressive or degressive vibration damping is desired, or even a multiple-variable vibration damping is desired. For example, there is a slight increase in damping moment for the region close to idling, and there is a steep increase in damping moment for a main load torque, which again decreases increasingly degressively, and a progressive increase in damping moment is again established up to a maximum transfer of a transmittable torque.

In particular, each group includes two rows of rolling elements, and a first row of rolling elements cooperates with the first disk on a first side of the input part and the output part. A second row of rolling elements cooperate on a second side opposite the first side along the axial direction with a second disk extending along the circumferential direction about the axis of rotation. The second disk is also the component that can be shifted along the axial direction or thus forms a further component that is shifted along the axial direction when a torque gradient occurs.

The input part then has first ramps for each row of the first group. The first ramps are formed on the first side and on the second side of the input part.

In addition to the first disk (for the first row and the first group), the second disk then also has second ramps for the second row (and the first group).

The output part then also has first ramps for each row of the second group. The first ramps are formed on the first side and on the second side of the output part.

In addition to the first disk (for the first row and the second group), the second disk then also has second ramps for the second row (and the second group).

In particular, the second disk is arranged to be axially fixed at a first end of at least one connecting element. The at least one connecting element extends from the first end along the axial direction through the first disk to a second end. The plurality of energy storage elements are arranged between the second end and the first disk.

When a torque gradient occurs, on the one hand the first disk is shifted along the axial direction (along a first axial direction). At the same time, the second disk is shifted along the axial direction (along a second axial direction opposite to the first axial direction). The first end and the second end of the connecting element are shifted along the axial direction (along the second axial direction) via the second disk so that the energy storage elements are compressed on both sides, i.e., by the first disk and via the second end.

In particular, a plurality of connecting elements is provided which are distributed along the circumferential direction (and spaced apart from one another), and a third disk extends along the circumferential direction around the axis of rotation being arranged to be axially fixed at the second end, on which the plurality of energy storage elements are located opposite the support in the axial direction.

In particular, the plurality of energy storage elements (and the plurality of connecting elements) can be shifted at least along the axial direction with respect to the input part and the output part (i.e., not arranged to be axially fixed with respect to the input part and the output part) or rotatable along the circumferential direction with respect to the input part and the output part (i.e., not rotationally fixed with respect to the input part and the output part) (or both).

The connecting element is connected to the second disk and/or to the third disk, in particular via a screw or a rivet connection. In particular, the first end and/or the second end forms a rivet connection with the respective disk.

In particular, the connecting element serves as a guide for the energy storage element. In particular, the connecting element extends through the energy storage element along the axial direction.

In particular, the torsional vibration damper is arranged within a housing. In particular, the torsional vibration damper can be arranged separately from other components via the housing. In particular, seals can be provided via which the torsional vibration damper can be arranged in a fluid-tight manner within the housing. In particular, the torsional vibration damper is lubricated with oil or grease within the housing.

In particular, the rolling elements and/or the ramps are designed to be compensated.

In particular, the rolling elements are made of 100Cr6.

In particular, the ramps are made of case-hardened steel.

In particular, each group of rolling elements is provided with its own cage.

In particular, each row of rolling elements is provided with its own cage.

In particular, a common cage is provided for both groups of a row of rolling elements.

In particular, a common cage is provided for both rows of a group of rolling elements.

In particular, a common cage is provided for all rolling elements.

The rolling elements can be fixed in positions that are spaced apart and fixed relative to one another via a cage.

In particular, the torsional vibration damper has a greatest length (L) along the axial direction and a greatest diameter (D) along the radial direction (transverse to the axial direction). In particular, the largest diameter is formed by the input part and/or by the housing and the greatest length by the output part and/or by the housing. In particular, no (friction) linings that transmit torque to the input part are taken into account. In particular, the greatest length is greater than the greatest diameter*0.3; so $L>D*0.3$; in particular, $L>D*0.5$ applies.

A component (for example an internal combustion engine, a friction clutch, an electrical machine, a generator, a dual-mass oscillator, etc.) of a drive train is also proposed which has the torsional vibration damper described above.

As a precaution, it should be noted that the numerals used here ("first", "second", etc.) serve primarily (only) to distinguish between several similar objects, sizes, or processes, and in particular no dependency and/or sequence of these objects, sizes or processes mandatory to each other is purported. If a dependency and/or sequence is necessary, this is explicitly stated here or results in a manner obvious to the person skilled in the art when studying the specifically described configuration. If a component can occur several times ("at least one"), the description of one of these components can apply equally to all or part of the majority of these components, but this is not mandatory.

BRIEF DESCRIPTION OF THE DRAWINGS

Both the present disclosure and the technical field are explained in more detail below with reference to the accompanying figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. In the figures.

DETAILED DESCRIPTION

Figure 1:
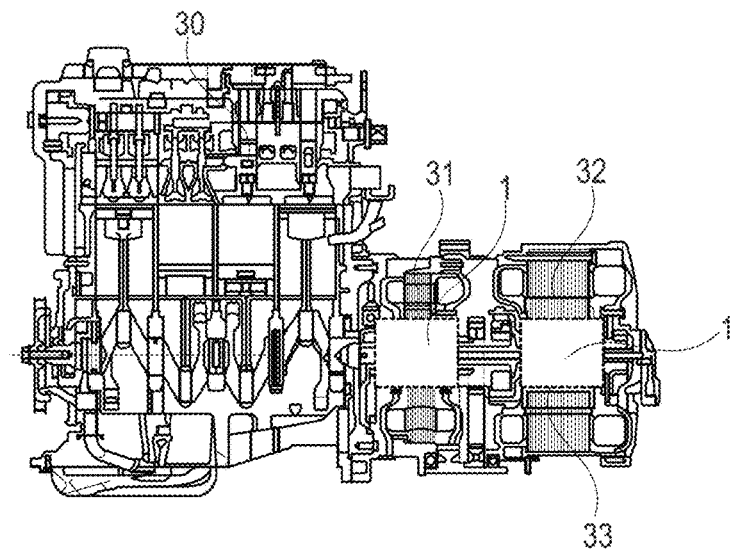
FIG. 1 shows a drive train with an internal combustion engine, a generator and an electric machine, wherein the possible positions for the arrangement of a torsional vibration damper are shown.

FIG. 1 shows a drive train having an internal combustion engine 30, a generator 31, and an electrical machine 32, wherein the possible positions for the arrangement of a torsional vibration damper 1 are shown. In the case of the electrical machine 32, the torsional vibration damper 1 can be arranged within the rotor 33.

Figure 2:
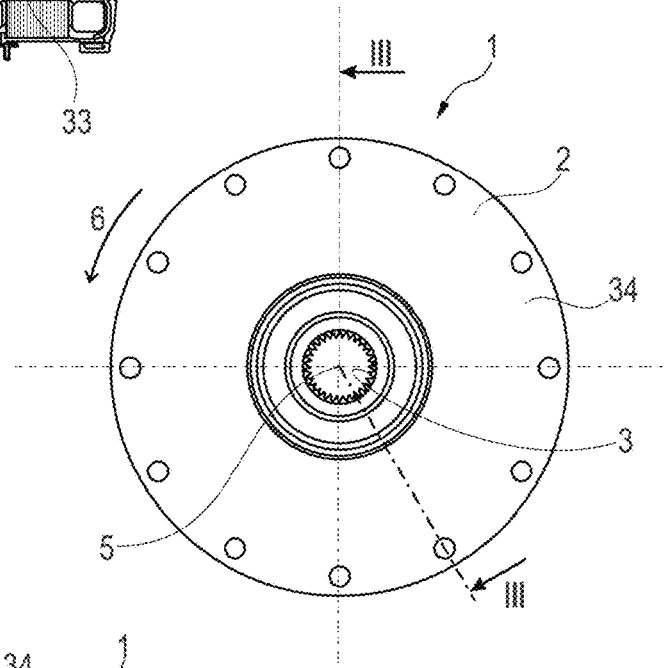
FIG. 2 shows a torsional vibration damper in a view along the axis of rotation.
Figure 3:
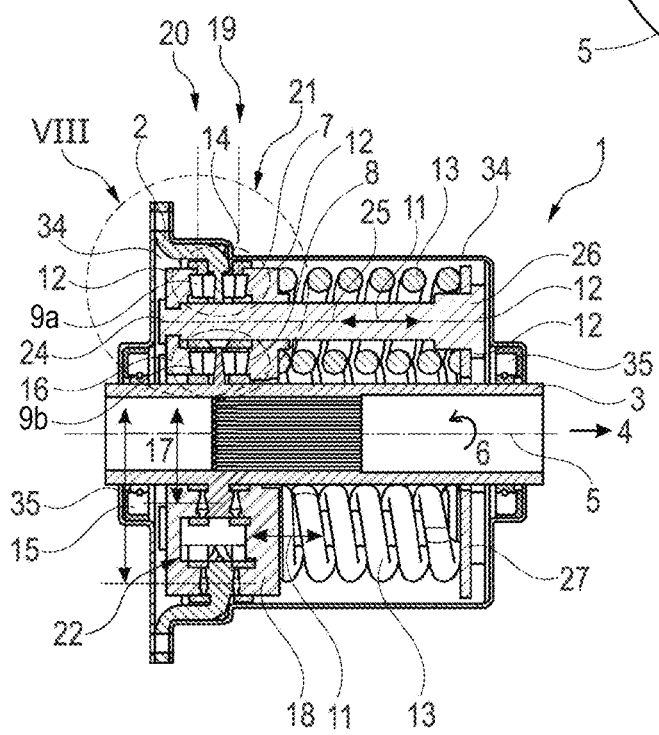
FIG. 3 shows the torsional vibration damper according to FIG. 2 in a side view in section along the line III-III according to FIG. 2.
Figure 4:
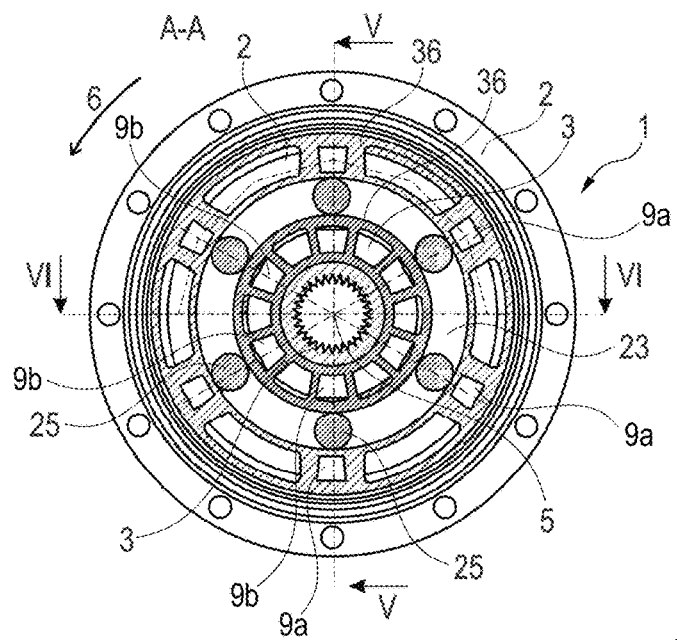
FIG. 4 shows the torsional vibration damper according to FIGS. 2 and 3 in a view along the axis of rotation, in section along the line IV-IV according to FIG. 5.
Figure 5:
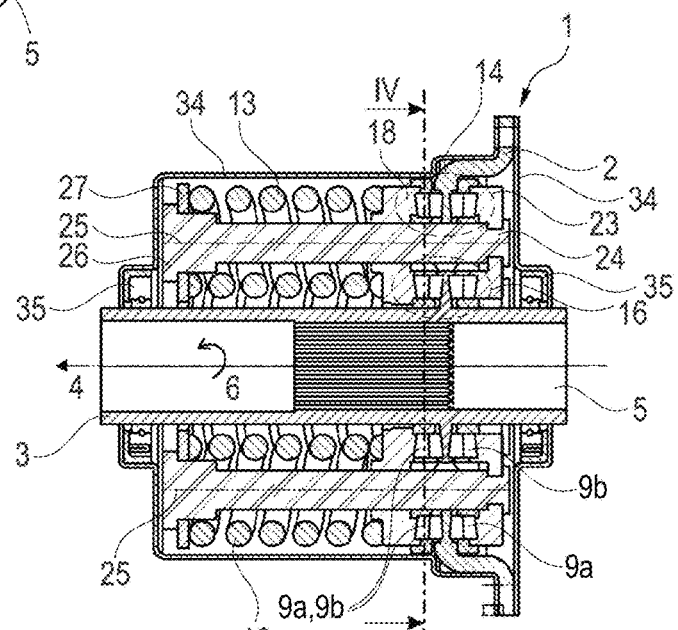
FIG. 5 shows the torsional vibration damper according to FIGS. 2 to 4 in a side view in section along the line V-V according to FIG. 4.
Figure 6:
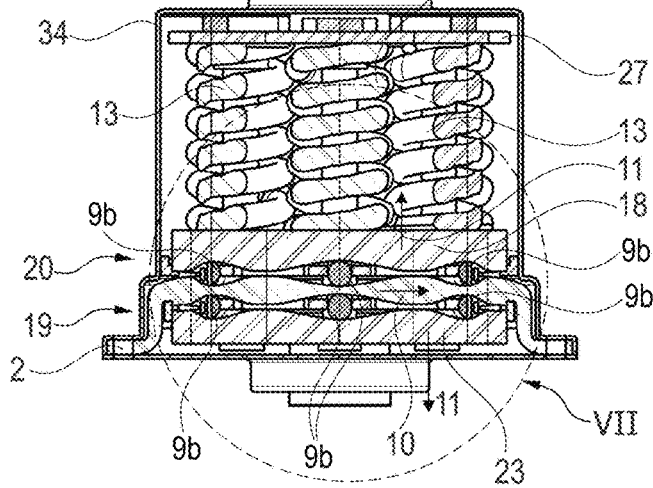
FIG. 6 shows the torsional vibration damper according to FIGS. 2 through 5 in a side view in section along the line VI-VI according to FIG. 4.
Figure 7:
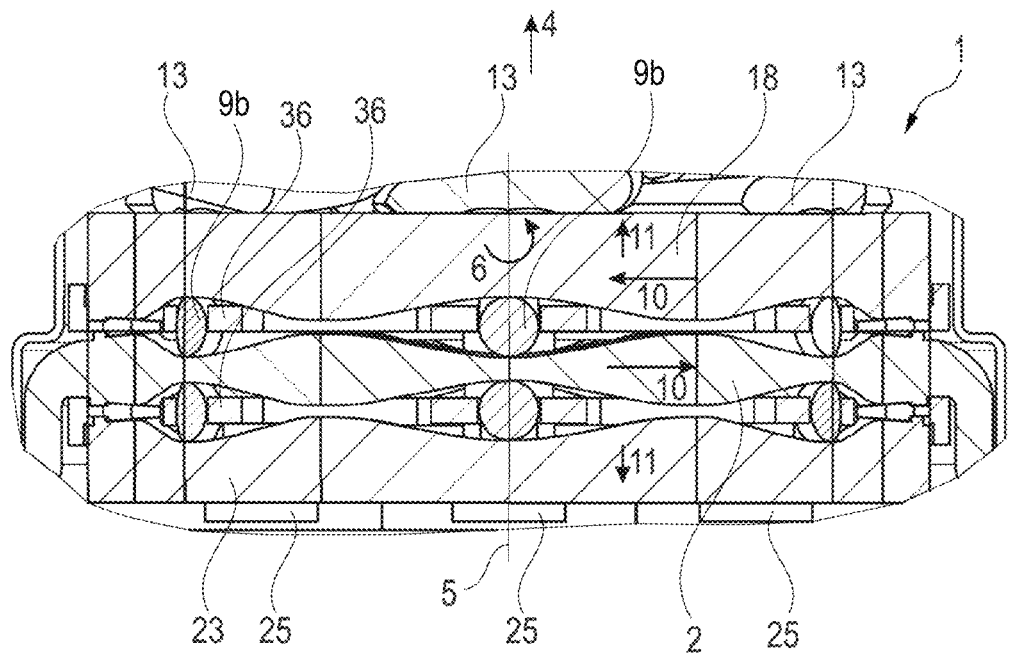
FIG. 7 shows a detail VII according to FIG. 6 of the torsional vibration damper according to FIGS. 2 through 6.
Figure 8:
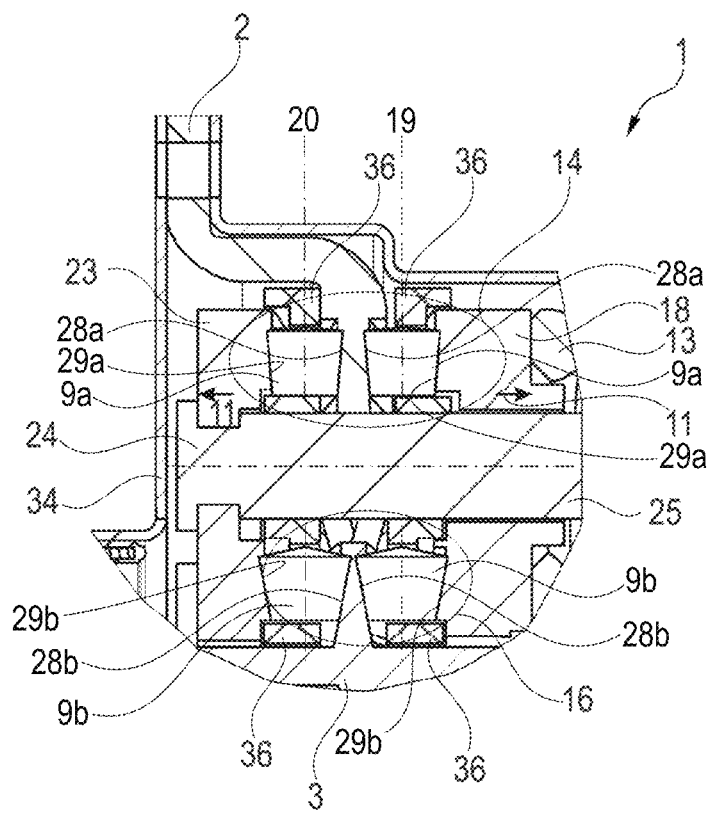
FIG. 8 shows a detail VIII according to FIG. 3 of the torsional vibration damper according to FIGS. 2 through 6.

FIG. 2 shows a torsional vibration damper 1 in a view along the axis of rotation 5. FIG. 3 shows the torsional vibration damper 1 according to FIG. 2 in a side view in section along the line III-III according to FIG. 2. FIG. 4 shows the torsional vibration damper 1 according to FIGS. 2 and 3 in a view along the axis of rotation 5, in section along the line IV-IV according to FIG. 5. FIG. 5 shows the torsional vibration damper 1 according to FIGS. 2 through 4 in a side view in section along the line V-V according to FIG. 4. FIG. 6 shows the torsional vibration damper 1 according to FIGS. 2 through 5 in a side view in section along the line VI-VI according to FIG. 4. FIG. 7 shows a detail VII according to FIG. 6 of the torsional vibration damper 1 according to FIGS. 2 to 6. FIG. 8 shows a detail VIII according to FIG. 3 of the torsional vibration damper 1 according to FIGS. 2 to 6. FIGS. 2 to 8 are described together below.

The torsional vibration damper includes an input part 2 and an output part 3 with a common axis of rotation 5 extending along an axial direction 4. The input part 2 and the output part 3 can be rotated to a limited extent relative to one another along a circumferential direction 6 when a torque is transmitted (e.g., introduction via the input part 2 to the output part 3 and forwarding via the output part 3; or vice versa). The torsional vibration damper 1 has two ramp systems 7, 8 with rolling elements 9a, 9b, respectively, through which a relative rotation 10 of the input part 2 and output part 3 in a shifting 11 along the axial direction 4 of at least one component 12 (the first disk 18, the second disk 23, of the connecting element 25, the third disk 27) of the torsional vibration damper 1 can be implemented. The torsional vibration damper 1 has a plurality of energy storage elements 13, wherein all energy storage elements 13 of the torsional vibration damper 1 are evenly distributed along the circumferential direction 6 and arranged to be spaced apart from one another, and each extends along the axial direction 4 and can be elastically deformable in the axial direction 4.

The input part 2 and the output part 3 are arranged to be axially fixed to one another, so that the shifting 11 is transmitted to the energy storage elements 13 via another component 12.

The ramp systems 7, 8 have tapered rollers as rolling elements 9a, 9b, respectively. The energy storage elements 13 are designed as compression springs.

A first group 14 of rolling elements 9a is arranged on a first diameter 15 in a first ramp system 7 and a second group 16 of rolling elements 9b is arranged on a second diameter 17 (deviating from the first diameter 15) in a second ramp system 8.

The first group 14 and the second group 16 have rolling elements 9a, 9b, respectively, that differ from one another (see FIG. 8).

The first ramp system 7 is formed by the input part 2 and a first disk 18 extending along the circumferential direction 6 around the axis of rotation 5, wherein the first group 14 is arranged between the input part 2 and the first disk 18. The second ramp system 8 is formed by the output part 3 and the first disk 18, wherein the second group 16 is arranged between the output part 3 and the first disk 18. The first disk 18 is one of the components 12 that can be shifted along the axial direction 4.

Each ramp system 7, 8 is formed by first ramps 28a and second ramps 29a, wherein a rolling element 9a is arranged between a first ramp 28a and a second ramp 29a, which form a pair of ramps. Similarly, each ramp system 8 is formed by first ramps 28b and second ramps 29b, wherein a rolling element 9b is arranged between a first ramp 28b and a second ramp 29b, which form a pair of ramps. In the case of the first group 14, a plurality of first ramps 28a are formed on the input part 2. The second ramps 29a of the first group 14 are formed on the first disk 18. In the second group 16, a plurality of first ramps 28b are formed on the output part 3. The second ramps 29b of the second group 16 are formed on the first disk 18.

Each group 14, 16 includes two rows 19, 20 of each of rolling elements 9a, 9b, respectively, wherein a first row 19 of rolling elements 9a cooperates with the first disk 18 on a first side 21 of the input part 2 and the first row 19 of rolling elements 9b cooperates with the first disk 18 on a first side 21 of the output part 3. A second row 20 of rolling elements 9a, 9b cooperate on a second side 22 opposite the first side 21 along the axial direction 4 with a second disk 23 extending along the circumferential direction 6 about the axis of rotation 5. The second disk 23 is also a component 12 that can be shifted along the axial direction 4.

The input part 2 has first ramps 28a for each row 19, 20 of the first group 14. The first ramps 28a are formed on the first side 21 and on the second side 22 of the input part 2.

In addition to the first disk 18 (for the first row 19 and the first group 14), the second disk 23 also has second ramps 29a for the second row 20 and the first group 14.

The output part 3 has first ramps 28b for each row 19, 20 of the second group 16. The first ramps 28b are formed on the first side 21 and on the second side 22 of the output part 3.

In addition to the first disk 18 for the first row 19 and the second group 16, the second disk 23 for the second row 20 and the second group 16 also has second ramps 29b.

The second disk 23 is arranged to be axially fixed at a first end 24 of a connecting element 25. The connecting element 25 extends from the first end 24 along the axial direction 4 through the first disk 18 to a second end 26. A third disk 27 is arranged to be axially fixed at the second end 26. The plurality of energy storage elements 13 are arranged along the axial direction 4 between the second end 26 or the third disk 27 and the first disk 18.

When a torque gradient occurs, on the one hand the first disk 18 is shifted along the axial direction 4 (along a first axial direction). At the same time, the second disk 23 is shifted along the axial direction 4 (along a second axial direction opposite to the first axial direction). Via the second disk 23, the first end 24 and the second end 26 of the connecting element 25 are shifted along the axial direction 4 (along the second axial direction), so that the energy storage elements 13 on both sides, i.e., through the first disk 18 and over the second end 26 or the third disk 27 are compressed.

The plurality of energy storage elements 13 and the plurality of connecting elements 25 can be shifted along the axial direction 4 with respect to the input part 2 and the output part 3 (i.e., not axially fixed with respect to the input part 2 and the output part 3) and along the circumferential direction 6 with respect to the input part 2 and the output part 3 rotatable (i.e., not rotationally fixed with respect to the input part 2 and the output part 3).

The connecting element 25 is connected to the second disk 23 via a rivet connection. The first end 24 forms a rivet connection with the second disk 23.

The connecting element 25 serves as a guide for the energy storage element 13. The connecting element 25 extends along the axial direction 4 through the energy storage element 13.

The torsional vibration damper 1 is arranged inside a housing 34. It can be arranged separately from other components via the housing 34. Seals 35 are provided, via which the torsional vibration damper 1 is arranged in a fluid-tight manner within the housing 34.

A separate cage 36 is provided for each group 14, 16 and each row 19, 20 of rolling elements 9a, 9b.

Figure 9:
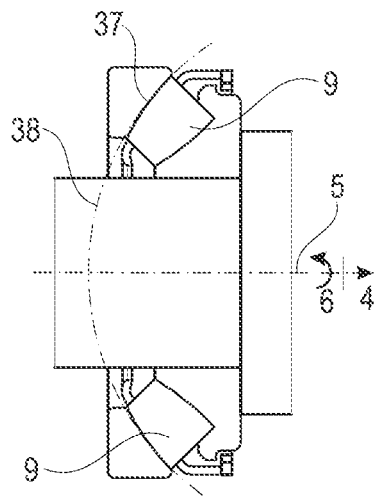
FIG. 9 shows a spherical roller bearing for the torsional vibration damper in a side view in section.
Figure 10:
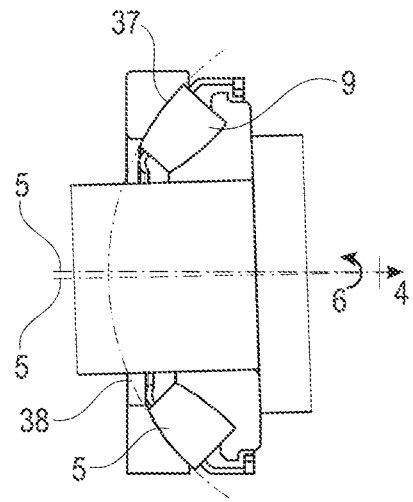
FIG. 10 shows the spherical roller bearing according to FIG. 9 in a pivoted arrangement.

FIG. 9 shows a spherical roller bearing for the torsional vibration damper 1 in a side view in section. FIG. 10 shows the spherical roller bearing according to FIG. 9 in a pivoted arrangement, wherein the axes of rotation 5 are tilted relative to one another. FIGS. 9 and 10 are described together below.

The rolling elements 9 are designed as conical spherical rollers, the lateral surfaces 37 of which are arranged on a common circular radius 38.

Figure 11:
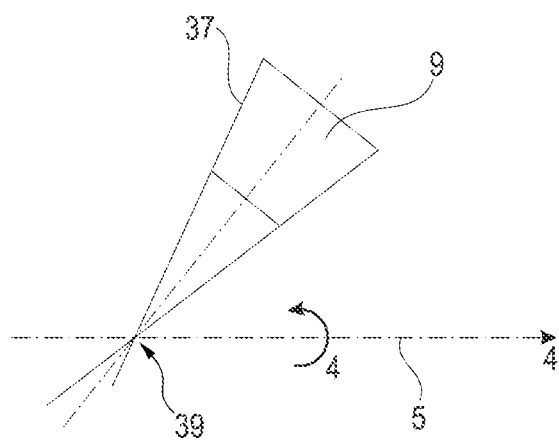
FIG. 11 shows a tapered roller bearing for the torsional vibration damper in a side view in section.

FIG. 11 shows a tapered roller bearing for the torsional vibration damper 1 in a side view in section. The tip 39 of a cone, formed by a lateral surface 37, of the rolling element 9 designed as a conical roller is arranged on the axis of rotation 5.

REFERENCE NUMERALS

1 Torsional vibration damper
2 Input part
3 Output part
4 Axial direction
5 Axis of rotation
6 Circumferential direction
7 First ramp system
8 Second ramp system
9, 9a, 9b Rolling element
10 Rotation
11 Shifting
12 Component
13 Energy storage element
14 First group
15 First diameter
16 Second group
17 Second diameter
18 First disk
19 First row
20 Second row
21 First side
22 Second side
23 Second disk
74 First end
25 Connecting element
26 Second end
27 Third disk
28a, 28b First ramp
29a, 29b Second ramp
30 internal combustion engine
31 Generator
32 Electric machine
33 Rotor
34 Housing
35 Seal
36 Cage
37 Lateral surface
38 Circle radius
39 Tip

The invention claimed is:

1. A torsional vibration damper comprising:
a common axis of rotation extending along an axial direction;
an input part;
an output part, rotatable relative to the input part in a limited manner with torque transmission;
a ramp system comprising:
an axially displaceable component comprising a first disk;
a plurality of rolling elements for converting rotation of the input part relative to the output part into an axial shifting of the axially displaceable component;
a plurality of energy storage elements:
arranged distributed along a circumferential direction;
extending along the axial direction; and
elastically deformable in the axial direction
a first ramp system extending along the circumferential direction and comprising a first group of the plurality of rolling elements arranged on a first diameter between the input part and the first disk; and
a second ramp system extending along the circumferential direction and comprising a second group of the plurality of rolling elements arranged on a second diameter, different than the first diameter, between the output part and the first disk.

2. The torsional vibration damper of claim 1 wherein the plurality of rolling elements are tapered rollers or conical spherical rollers.

3. The torsional vibration damper of claim 1 wherein the energy storage elements are compression springs.

4. The torsional vibration damper of claim 1 wherein each one of the first group is shaped differently than each one of the second group.

5. The torsional vibration damper of claim 1 wherein all of the first group and the second group are identically shaped.

6. The torsional vibration damper of claim 1 wherein:
the axially displaceable component comprises a second disk;
the first group comprises:
a first group first row arranged between a first axial side of the input part and the first disk; and
a first group second row arranged between a second axial side of the input part, opposite the first axial side, and the first second disk; and
the second group comprises:
a second group first row arranged between the first axial side of the output part and the first disk; and
a second group second row arranged between the second axial side of the output part and the second disk.

7. The torsional vibration damper of claim 6 further comprising a connecting element, wherein:
the second disk is axially fixed at a first end of the connecting element;
the connecting element extends from the first end along the axial direction through the first disk to a second end; and
the plurality of energy storage elements is arranged between the second end and the first disk.

8. The torsional vibration damper of claim 7 further comprising a third disk, wherein:
- the connecting element comprises a plurality of connecting elements distributed along the circumferential direction and fixed to the third disk at the second end; and
- the plurality of energy storage elements are axially supported on the third disk.

9. The torsional vibration damper of claim 1 wherein:
- the plurality of energy storage elements can be shifted along the axial direction with respect to the input part and the output part; or
- the plurality of energy storage elements can be rotated along the circumferential direction with respect to the input part and the output part.

* * * * *